US009901888B2

(12) United States Patent
Nicolson

(10) Patent No.: US 9,901,888 B2
(45) Date of Patent: Feb. 27, 2018

(54) HIGH FLOW NOZZLE FOR FIBER-REINFORCED CONCRETE

(71) Applicant: TUSCAN STONEWORX USA, LLC, Orem, UT (US)

(72) Inventor: David L. Nicolson, Lindon, UT (US)

(73) Assignee: TUSCAN STONEWORX USA, LLC, Orem, UT (US)

( * ) Notice: Subject to any disclaimer, the term of this patent is extended or adjusted under 35 U.S.C. 154(b) by 172 days.

(21) Appl. No.: 14/740,001

(22) Filed: Jun. 15, 2015

(65) Prior Publication Data

US 2015/0273409 A1    Oct. 1, 2015

Related U.S. Application Data

(60) Division of application No. 14/466,604, filed on Aug. 22, 2014, now Pat. No. 9,139,473, which is a
(Continued)

(51) Int. Cl.
*B05B 7/06* (2006.01)
*B01F 3/12* (2006.01)
(Continued)

(52) U.S. Cl.
CPC .......... *B01F 3/1271* (2013.01); *B01F 3/1214* (2013.01); *B01F 15/0274* (2013.01);
(Continued)

(58) Field of Classification Search
CPC .. B01F 3/1271; B01F 3/1214; B01F 15/0274; B05B 7/0433; B05B 7/0491;
(Continued)

(56) References Cited

U.S. PATENT DOCUMENTS 2,647,287 A    8/1953 Jones
2,741,341 A    4/1956 Anderson
(Continued)

FOREIGN PATENT DOCUMENTS

DE    10047283    9/2000
DE    102010000600    10/2001
(Continued)

*Primary Examiner* — Steven J Ganey
(74) *Attorney, Agent, or Firm* — Workman Nydegger

(57) ABSTRACT

Glass-fiber-reinforced concrete compositions that may be sprayed, and methods of preparing and applying such compositions. Such compositions may include cement, reinforcing glass fibers randomly oriented and homogenously distributed throughout the concrete composition, and a particle packing aggregate. At least a portion of the particle packing aggregate may be rounded rather than crushed and include a first aggregate portion having a first particle size and a second aggregate portion having a second particle size that is smaller than the first particle size so that the aggregate is capable of particle packing. The uncured compositions can be delivered through a spray nozzle with the glass fibers already mixed into the composition. The compositions can provide uniform, non-directional strength characteristics, e.g., modulus of rupture of at least 16 MPa and a limit of proportionality of at least 7 MPa with a glass-fiber content of no more than 4% by weight.

19 Claims, 9 Drawing Sheets

Related U.S. Application Data continuation-in-part of application No. 13/763,466, filed on Feb. 8, 2013, now Pat. No. 8,863,456.

(60) Provisional application No. 61/596,801, filed on Feb. 9, 2012.

(51) Int. Cl.

| | | |
|---|---|---|
| *C04B 14/42* | (2006.01) | |
| *B05D 1/02* | (2006.01) | |
| *B05B 7/04* | (2006.01) | |
| *C04B 28/02* | (2006.01) | |
| *C04B 40/00* | (2006.01) | |
| *B01F 15/02* | (2006.01) | |
| *C04B 111/00* | (2006.01) | |

(52) U.S. Cl.
CPC .......... *B05B 7/0433* (2013.01); *B05B 7/0491* (2013.01); *B05B 7/062* (2013.01); *B05D 1/02* (2013.01); *C04B 14/42* (2013.01); *C04B 28/02* (2013.01); *C04B 40/0028* (2013.01); *B01F 2215/0047* (2013.01); *C04B 2111/00129* (2013.01); *C04B 2111/00155* (2013.01)

(58) Field of Classification Search
CPC .......... B05B 7/062; B05B 7/066; B05B 7/04; B05B 7/06; C04B 2111/00146; C04B 2111/00155
USPC ............ 239/290, 296, 525, 407, 413, 416.1, 239/416.4, 417.5, 422, 419, 419.3, 423, 239/424, 433, 428
See application file for complete search history.

(56) References Cited

U.S. PATENT DOCUMENTS

| | | | |
|---|---|---|---|
| 3,353,314 A | 11/1967 | Melcher | |
| 3,392,497 A | 7/1968 | Cushman | |
| 3,400,958 A | 9/1968 | Haimes et al. | |
| 3,496,692 A | 2/1970 | Melcher | |
| 4,069,629 A | 1/1978 | Piazza | |
| 4,186,536 A | 2/1980 | Piazza | |
| 4,225,086 A * | 9/1980 | Sandell | B05B 5/032 |
| | | | 239/428 |
| 4,229,497 A | 10/1980 | Piazza | |
| 4,232,494 A | 11/1980 | Bauch et al. | |
| 4,252,767 A | 2/1981 | Piazza et al. | |
| 4,263,346 A * | 4/1981 | Sandell | B05B 7/1495 |
| | | | 239/424 |
| 4,292,783 A | 10/1981 | Mulvihill | |
| 4,417,430 A | 11/1983 | Loikitz | |
| 4,507,010 A | 3/1985 | Fujiya | |
| 4,574,537 A | 3/1986 | Krieger | |
| 4,774,794 A | 10/1988 | Grieb | |
| 4,796,814 A * | 1/1989 | Klemm | B05B 7/1481 |
| | | | 239/433 |
| 4,804,563 A * | 2/1989 | Hillemeier | B05B 7/1436 |
| | | | 427/426 |
| 4,936,069 A | 6/1990 | Hunter et al. | |
| 4,942,702 A | 7/1990 | Lemasson | |
| 5,212,924 A | 5/1993 | Finkelstein | |
| 5,372,769 A | 12/1994 | Ryberg | |
| 5,424,118 A | 6/1995 | McLaughlin | |
| 5,452,925 A | 9/1995 | Huang | |
| 5,506,046 A | 4/1996 | Andersen et al. | |
| 5,508,072 A | 4/1996 | Andersen et al. | |
| 5,509,242 A | 4/1996 | Rechsteiner et al. | |
| 5,545,450 A | 8/1996 | Andersen et al. | |
| 5,580,409 A | 12/1996 | Andersen et al. | |
| 5,580,624 A | 12/1996 | Andersen et al. | |
| 5,614,307 A | 3/1997 | Andersen et al. | |
| 5,618,341 A | 4/1997 | Andersen et al. | |
| 5,662,731 A | 9/1997 | Andersen et al. | |
| 5,679,145 A | 10/1997 | Andersen et al. | |
| 5,679,432 A | 10/1997 | Holmquest et al. | |
| 5,683,772 A | 11/1997 | Andersen et al. | |
| 5,697,189 A | 12/1997 | Miller et al. | |
| 5,849,155 A | 12/1998 | Gasland | |
| 6,006,480 A | 12/1999 | Rook | |
| 6,070,919 A | 6/2000 | Finkelstein | |
| 6,079,754 A | 6/2000 | Alexy | |
| 6,119,427 A | 9/2000 | Wyman et al. | |
| 6,200,404 B1 | 3/2001 | Andersen et al. | |
| 6,299,224 B1 | 10/2001 | Finkelstein | |
| 6,379,446 B1 | 4/2002 | Andersen et al. | |
| 6,438,923 B2 | 8/2002 | Miller | |
| 6,460,213 B1 | 10/2002 | Flint et al. | |
| 6,584,740 B2 | 7/2003 | Record | |
| 6,761,007 B2 | 7/2004 | Lancelot et al. | |
| 6,869,669 B2 | 3/2005 | Jensen et al. | |
| 6,898,908 B2 | 5/2005 | Messenger et al. | |
| RE39,339 E | 10/2006 | Andersen et al. | |
| 8,528,288 B1 | 9/2013 | Kinser, Jr. | |
| 8,863,456 B2 | 10/2014 | Nicolson | |
| 9,139,473 B2 | 9/2015 | Nicolson | |
| 2002/0139075 A1 | 10/2002 | Shubow et al. | |
| 2005/0204698 A1 | 9/2005 | Werner et al. | |
| 2005/0258572 A1 | 11/2005 | Messenger et al. | |
| 2012/0219747 A1 | 8/2012 | Kanao | |

FOREIGN PATENT DOCUMENTS

| | | |
|---|---|---|
| DE | 202012101988 | 8/2012 |
| FR | 2294291 | 9/1976 |
| FR | 2547610 | 12/1984 |
| GB | 1588899 | 4/1981 |
| GB | 1594353 | 7/1981 |
| GB | 2187446 | 9/1987 |
| WO | WO8808912 | 11/1988 |
| WO | WO2013093193 | 6/2013 |

\* cited by examiner

HIGH FLOW NOZZLE FOR FIBER-REINFORCED CONCRETE

CROSS REFERENCE TO RELATED APPLICATION

This application is a division of U.S. patent application Ser. No. 14/466,604 filed Aug. 22, 2014, which is a continuation-in-part of U.S. patent application Ser. No. 13/763,466 filed Feb. 8, 2013, which claims the benefit of earlier-filed U.S. Provisional Application No. 61/596,801, filed Feb. 9, 2012. The disclosure of each of the foregoing applications is incorporated herein in its entirety.

BACKGROUND OF THE INVENTION

1. The Field of the Invention

This invention relates to glass-reinforced concrete compositions, methods of preparing and applying such compositions, as well as a spray nozzle device used in applying such compositions. In another aspect, the invention relates to composite structural insulated panels, related methods of manufacture, and building systems employing such panels. Such panels may be formed from the disclosed glass-reinforced concrete compositions.

2. Background and Relevant Art

Glass fibers have been used in concrete compositions to provide increased strength. However, when applying a concrete composition by spraying, glass fibers have been found to plug the flow of material through the spray device. As a result of such difficulties, where it is desired to apply a concrete composition by spraying, the concrete composition without glass fibers is delivered through a spray nozzle, while a spool of glass fibers is simultaneously fed to a location adjacent where the concrete composition exits the spray nozzle, the glass fiber is cut, and the fiber segments are thus entrained within the concrete composition while being sprayed onto a desired surface.

In addition, it can be difficult to disperse the glass fibers into the concrete composition so that their orientation is randomized. Rather, they tend to be preferentially aligned in one direction, leading to non-uniform, directional strength characteristics. More uniform strength characteristics throughout the cured concrete, independent of direction, could be achieved if the orientation of the glass fibers were more randomized.

In addition, when applying a concrete composition by spraying, often the spray characteristics at any given moment may be less than desirable (e.g., the composition does not seem to flow well, etc.). Thus, the operator of the spray equipment will often attempt to improve the spray and flow characteristics of the concrete composition through the spray equipment by adjusting various parameters of the concrete mixture itself (e.g., addition of water). Such on the fly adjustments to the concrete mixture itself are problematic because they can drastically and negatively affect the strength characteristics of the final cured concrete product. As a result, while the operator may be content that he or she is able to deliver the composition by spraying, it is difficult to know whether the strength characteristics of the finished product will be sufficient for a given use. This is particularly problematic for applications that require high strength and uniformity of strength.

As a result, many finished products have insufficient strength for use, resulting in waste. In addition, as a practical matter, current compositions and methods do not readily allow one to manufacture several components intended to be used together to provide high, substantially uniform strength characteristics from one manufactured component to the next. This is because it is often not known exactly how parameters of the concrete composition were adjusted during spraying.

As a result, there exists a need for improved glass-reinforced concrete compositions having guaranteed uniform high strength characteristics, spray devices for delivering such compositions in a manner that would eliminate the need for the operator to adjust spray parameters on the fly, products manufactured using such compositions, and methods and equipment that would provide uniform, guaranteed high strength.

BRIEF SUMMARY

The present invention is directed to glass-reinforced concrete compositions that may be sprayed, methods of preparing and applying such compositions, devices used in applying such compositions, and composite structural insulated panels that may be fabricated using such compositions, related methods of manufacture, and building systems employing such panels.

According to an embodiment, a fresh concrete composition (e.g., uncured, 3-part glass-fiber-reinforced concrete composition) providing predetermined and predictable strength characteristics, and which resists clogging when sprayed or extruded under pressure, is disclosed. The composition may include the mixture products of water, a cellulosic ether flow aid, cement, an acrylic plasticizer, a particle packing aggregate, and well dispersed glass fibers (e.g., randomly oriented and homogenously distributed throughout the fresh concrete composition). The particle packing aggregate may include a first aggregate portion having a first particle size, and a second portion having a second particle size that is smaller than the first particle size so as to be capable of particle packing. At least a portion of the particle packing aggregate may be rounded rather than crushed. A ratio of the water to the cement may be from about 0.25:1 to about 0.4:1. The glass fibers of the reinforcing part may be included in an amount that less than about 4% by weight of the concrete composition, which is sufficient to provide uniform and very high strength characteristics (e.g., a modulus of rupture of at least 16 MPa and a limit of proportionality of at least about 7 MPa).

Another embodiment is directed to a cured glass-fiber-reinforced concrete composition providing predetermined strength characteristics, which composition may include the reaction products of water, a cellulosic ether flow aid, cement, an acrylic plasticizer, a particle packing aggregate, a particle packing aggregate as described above, and well dispersed glass fibers (e.g., randomly oriented and homogenously distributed throughout the cured glass-fiber-reinforced concrete composition). Such a cured concrete composition may provide uniform, and very high strength characteristics (e.g., a modulus of rupture of at least 16 MPa and a limit of proportionality of at least about 7 MPa).

Another embodiment is directed to a method of preparing and applying such a fresh concrete composition, and then allowing the composition to cure, so as to provide predetermined strength characteristics. For example, the fresh concrete composition may be prepared by initially mixing the water, cellulosic ether flow aid, cement, acrylic plasticizer, and particle packing aggregate using a mixing blade at a first speed to form a fresh intermediate concrete composition, and then mixing the glass fibers into the fresh intermediate concrete composition using a mixing blade at a second speed that is slower than the first speed to form the fresh concrete composition.

The fresh concrete composition may then delivered to a spray nozzle for application to a desired surface (e.g., into a mold). The spray nozzle may include a nozzle body including a concrete delivery conduit for carrying the fresh concrete composition, the conduit extending between a proximal end and a delivery orifice at a distal delivery end. The spray nozzle may further include an axial air delivery conduit for providing compressed air to the fresh concrete composition within the concrete delivery conduit, the axial air delivery conduit extending between a proximal end and a distal end, the distal end terminating within the nozzle body prior to the delivery orifice of the concrete delivery conduit to deliver compressed air to the fresh concrete composition during use. A plurality of radial air delivery conduits may be included for providing compressed air to the fresh concrete composition within the concrete delivery conduit, the radial air delivery conduits being disposed radially about the distal delivery end of the nozzle body, the plurality of radial air delivery conduits being disposed distally relative to the distal end of the axial air delivery conduit to deliver compressed air to the fresh concrete composition as the fresh concrete composition exits the nozzle body through the delivery orifice for application to the desired surface. Upon curing, the concrete composition may provide uniform, very high strength characteristics, e.g., a modulus of rupture of at least 16 MPa and a limit of proportionality of at least 7 MPa with a glass-fiber content of no more than about 4% by weight.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

The present invention is directed to fresh (e.g., 3-part glass-fiber-reinforced) concrete compositions that may be sprayed, methods of preparing and applying such compositions, devices used in applying such compositions, and composite structural insulated panels that may be fabricated using such compositions, related methods of manufacture, and building systems employing such panels.

II. Exemplary Spray Nozzle Devices for Use in Spraying Fresh Concrete Compositions One aspect of the present invention is directed to a spray nozzle device for spraying a fresh concrete composition that includes glass fibers dispersed within the concrete composition, and that can be delivered and sprayed as such through the spray nozzle without clogging. Such a spray nozzle and/or rheological characteristics of the fresh concrete composition advantageously eliminate(s) any need for the glass fiber to be delivered separate from the fresh concrete composition, allowing the reinforcing glass fibers to be mixed into the fresh concrete composition prior to conveyance through the spray apparatus and delivery through the spray nozzle. This simplifies the overall process and eliminates a parameter that might be adjusted by the spray equipment operator in a way that might unknowingly weaken the resulting product or result in inconsistent strength characteristics.

Furthermore, dispersing the glass-fibers into the fresh concrete composition prior to conveying the composition through the spray nozzle aids in randomizing the orientation of the glass fibers so as to provide more uniform strength characteristics throughout the cured concrete composition.

The inventive spray nozzle is provided with two types of air delivery conduits rather than a single type of air delivery conduit. Delivery of compressed air through the two types of conduits is specifically configured to provide delivery of compressed air at two different locations within the nozzle to ensure good flow of the fresh concrete composition through the spray nozzle with substantially no plugging or clogging. This configuration has been found to overcome the plugging and poor flow characteristics associated with previous unsuccessful attempts to spray fiber-filled concrete compositions through a spray nozzle.

As will be described below in conjunction with a description of the concrete composition, a flow aid and plasticizer may also be included within the composition in a ratio that works with the two types of air delivery conduits to overcome prior plugging problems.

Figure 1A:
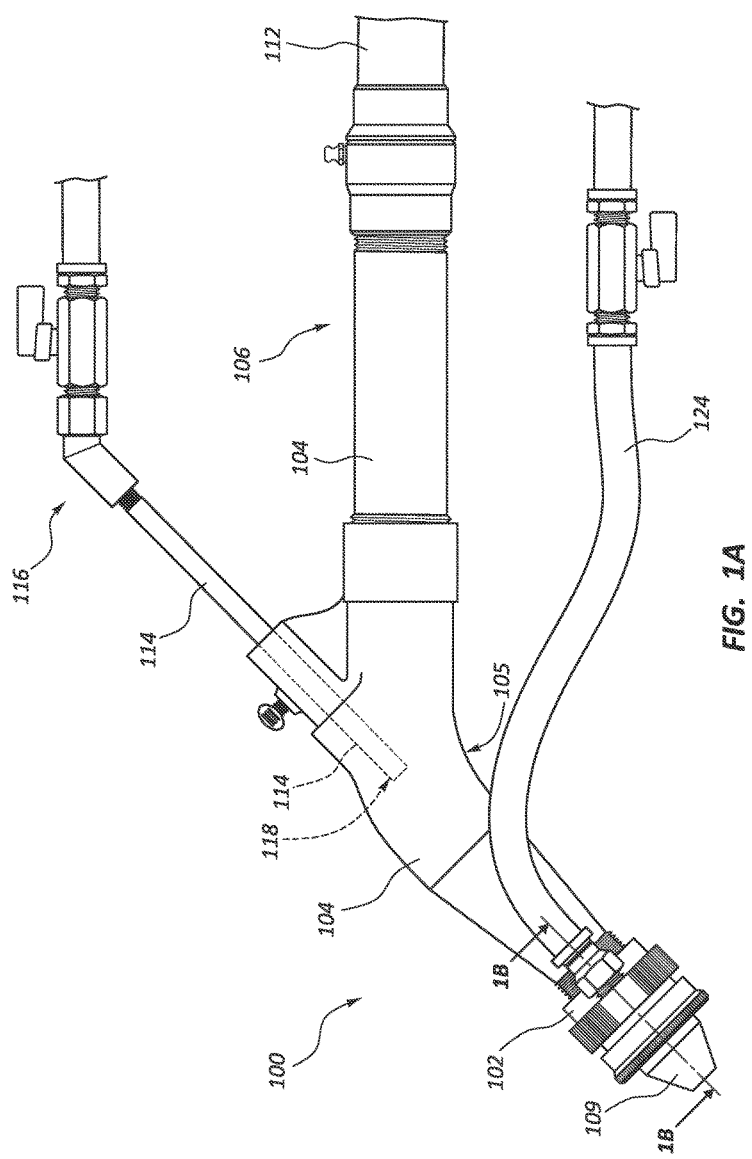
FIG. 1A is a perspective view illustrating an example spray nozzle according to one aspect of the present invention.
Figure 1B:
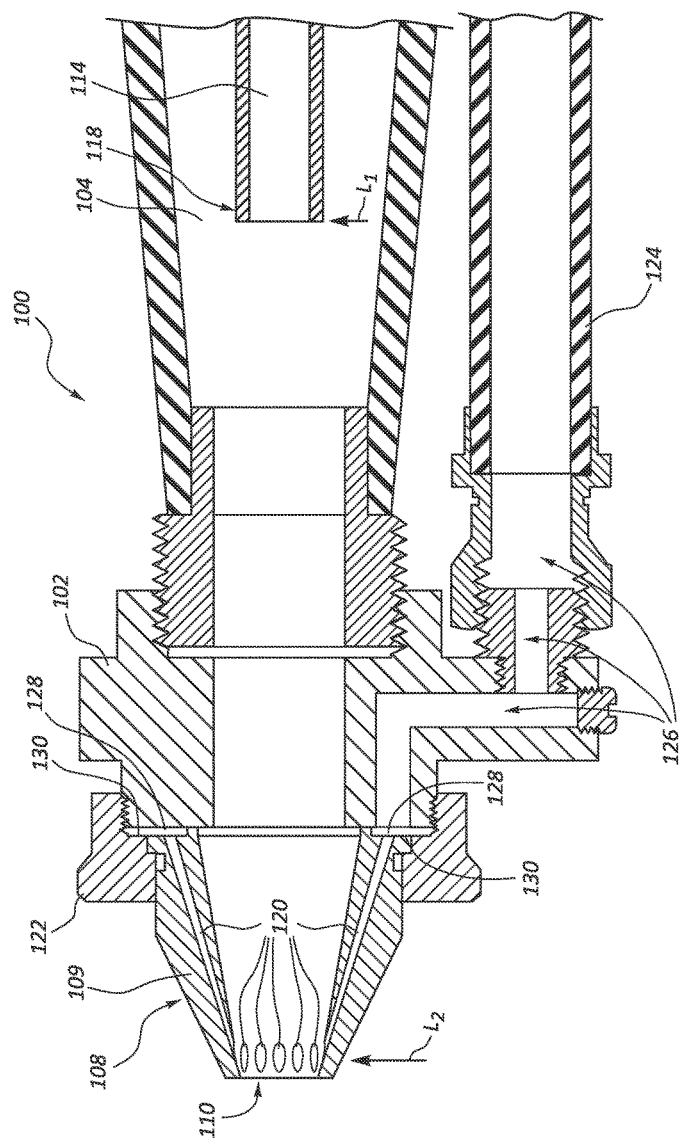
FIG. 1B is a cross-sectional view of the distal portion of the example spray nozzle of FIG. 1A.

Referring to FIGS. 1A-1B, according to one embodiment, the spray nozzle 100 includes a nozzle body 102 including a concrete delivery conduit 104 that extends between a proximal end 106 and a delivery orifice 110 at a distal delivery end 108 for conveying an uncured glass-fiber-reinforced concrete composition. The proximal end 106 can be coupled to a tube 112 or other structure for conveying the fresh concrete mixture to the spray nozzle 100. The spray nozzle 100 also includes an axial air delivery conduit 114 for providing compressed air to the fresh concrete composition within the concrete delivery conduit 104. The axial air delivery conduit 114 extends between a proximal end 116 and a distal end 118, and the distal end 118 terminates within the concrete delivery conduit 104 of the nozzle body 102 prior to (i.e., proximal to) the delivery orifice 110 of the concrete delivery conduit 104. As such, the axial air delivery conduit 114 delivers compressed air to the uncured glass-fiber-reinforced concrete composition at a first location $L_1$ (see FIG. 1B) during use.

The spray nozzle 100 also includes a plurality of radial air delivery conduits 120 for providing compressed air to the uncured glass-fiber-reinforced concrete composition within the distal portion 108 of concrete delivery conduit 104. The radial air delivery conduits 120 are disposed radially about the distal delivery end 108 of the nozzle body 102, and terminate at a location $L_2$ that is proximal to the delivery orifice 110, and distal to location $L_1$, where the axial air delivery conduit 114 terminates. This provides for delivery of compressed air through the axial air delivery conduit 114 at a first location $L_1$ and delivery of additional compressed air through the radial air delivery conduits 120 at a second, more distal location $L_2$. This configuration of compressed air delivery conduits advantageously allows delivery of an uncured concrete composition including glass-fibers dispersed therein without plugging of the spray nozzle apparatus 100, and without damage to the glass-fibers.

For example, where a conventional spray nozzle might clog when attempting to deliver a conventional glass-fiber-reinforced concrete composition at a given pressure of compressed air, the present spray nozzle, at the same air pressure (where the stream of compressed air is split between the axial conduit and the radial conduits) is advantageously able to deliver the same composition without clogging.

As shown in FIG. 1B, the distal end 118 of axial air delivery conduit 114 may be substantially concentric with the concrete delivery conduit 104 so as to deliver compressed air in trajectory that is substantially parallel with a longitudinal axis of the distal portion of concrete delivery conduit 104, downstream from a bend at 105. Bend 105 may occur prior to or at about the same location as termination 118 of conduit 114. Providing conduit 114 concentric with the distal portion of conduit 104 helps deliver compressed air through axial air delivery conduit 114 to the fresh concrete composition within the concrete delivery conduit 104 in a more uniform manner. This aids the fresh concrete composition in advancing uniformly through distal portion of delivery conduit 104. Although FIG. 1A shows conduit 114 terminating near bend 105, it may extend nearer to delivery orifice 110, as shown in FIG. 1B. FIG. 1A is shown terminating earlier for purposes of clarity.

As shown in FIG. 1B, axial air delivery conduit 114 terminates at location $L_1$, which may be about 2 inches to about 6 inches (e.g., from about 3 inches to about 5 inches, or about 4 inches) proximal to the location $L_2$ where radial air delivery conduits 120 terminate. This allows delivery of a first portion of compressed air to the fresh concrete composition at location $L_1$ (which may be delivered at the center of distal portion of conduit 104 where conduit 114 is concentric). This compressed air aids in conveying the fresh or uncured composition towards location $L_2$, where a second portion of compressed air is delivered to the fresh concrete composition at location $L_2$, near the delivery orifice 110.

The cross-section of FIG. 1B illustrates several of the radial air delivery conduits 120. In one embodiment, the spray nozzle may include from about 5 to about 20 radial air delivery conduits 120. One embodiment may include 12 such radial air delivery conduits arranged about the distal end of the spray nozzle in a substantially uniform arrangement. As perhaps best seen in FIG. 1B, the radial air delivery conduits 120 may be non-parallel relative to a longitudinal axis of the distal portion of concrete delivery conduit 104. This causes compressed air flowing from the radial air delivery conduits 120 to turbulently impinge on the fresh or uncured glass-fiber reinforced concrete composition within conduit 104. This configuration forces the fresh concrete composition towards the center of conduit 104, away from the sidewalls through which conduits 120 penetrate, and out nearby delivery orifice 110.

In one embodiment, the axial air delivery conduit 114 and the radial air delivery conduits may be connected to the same source of compressed air so that they deliver compressed air at the same air pressure. Splitting the stream of pressurized air in such a configuration provides compressed air at location $L_1$, and further downstream, additional air is delivered at location $L_2$, both at approximately the same pressure. While described in terms of delivery of compressed air, it will be understood that the term "air" is to be construed broadly, and other compressed gases could be used (e.g., compressed nitrogen, $CO_2$, etc.). Such other compressed gases are therefore within the scope of the term "air".

In one embodiment, the terminal location $L_2$ of radial air delivery conduits 120 is disposed at a distance that is from about 0.5 inch to about 0.125 inch (about 0.25 inch) proximal relative to delivery orifice 110. The conduit 104 within a coupleable distal nozzle head 109 of nozzle 100 just proximal to orifice 110 may be tapered so as to have a narrower diameter at delivery orifice 110 than at locations proximal thereto. The exterior surface of distal portion 108 may also be so tapered. Orifice 110 may have an inside diameter from about 0.125 inch to about 1.5 inch (e.g., about 0.5 to about 0.75 inch). Prior to tapered portion adjacent orifice 110, conduit 104 may have an inside diameter of about 0.75 inch to about 2 inches (e.g., about 0.75 to about 1.25 inch).

The proximal ends of each radial air delivery conduit 120 may be disposed within tapered, coupleable nozzle head 109 of device 100. Nozzle head 109 may be coupled in place over an adjacent portion of nozzle 100 by threaded coupling ring 122. In the illustrated embodiment, radial air delivery conduits 120 terminate at an open proximal end in a face 130 of tapered nozzle head 109. The open ends of conduits 120 in face 130 may be supplied with compressed air through supply line 124 in fluid communication with conduit 126 that extends through body 102 of device 100. Compressed air may thus be supplied through a single conduit 124, into conduit 126, to annular cavity 128 adjacent face 130, where the compressed air is delivered into each radial air delivery conduit 120.

III. Exemplary Methods of Preparing And Applying Glass-Fiber-Reinforced Concrete Compositions With Predetermined Strength Characteristics Another aspect of the present invention is directed to methods of preparing and applying fresh (e.g., 3-part glass-fiber reinforced) concrete compositions in a way that provides predetermined or guaranteed strength characteristics. Such a method may include providing a liquid part including water, providing a dry part including cement and an aggregate, and providing glass fibers. The liquid part and/or dry part may include a flow aid and/or plasticizer. The dry part is mixed with the liquid part using a mixing blade at a first speed to form an uncured concrete composition. The glass fibers are then mixed into the uncured concrete composition using the mixing blade at a second speed that is slower than that used to mix the dry and liquid parts. This disperses the glass-fibers substantially homogenously and with random orientation within the uncured concrete composition.

Figure 2:
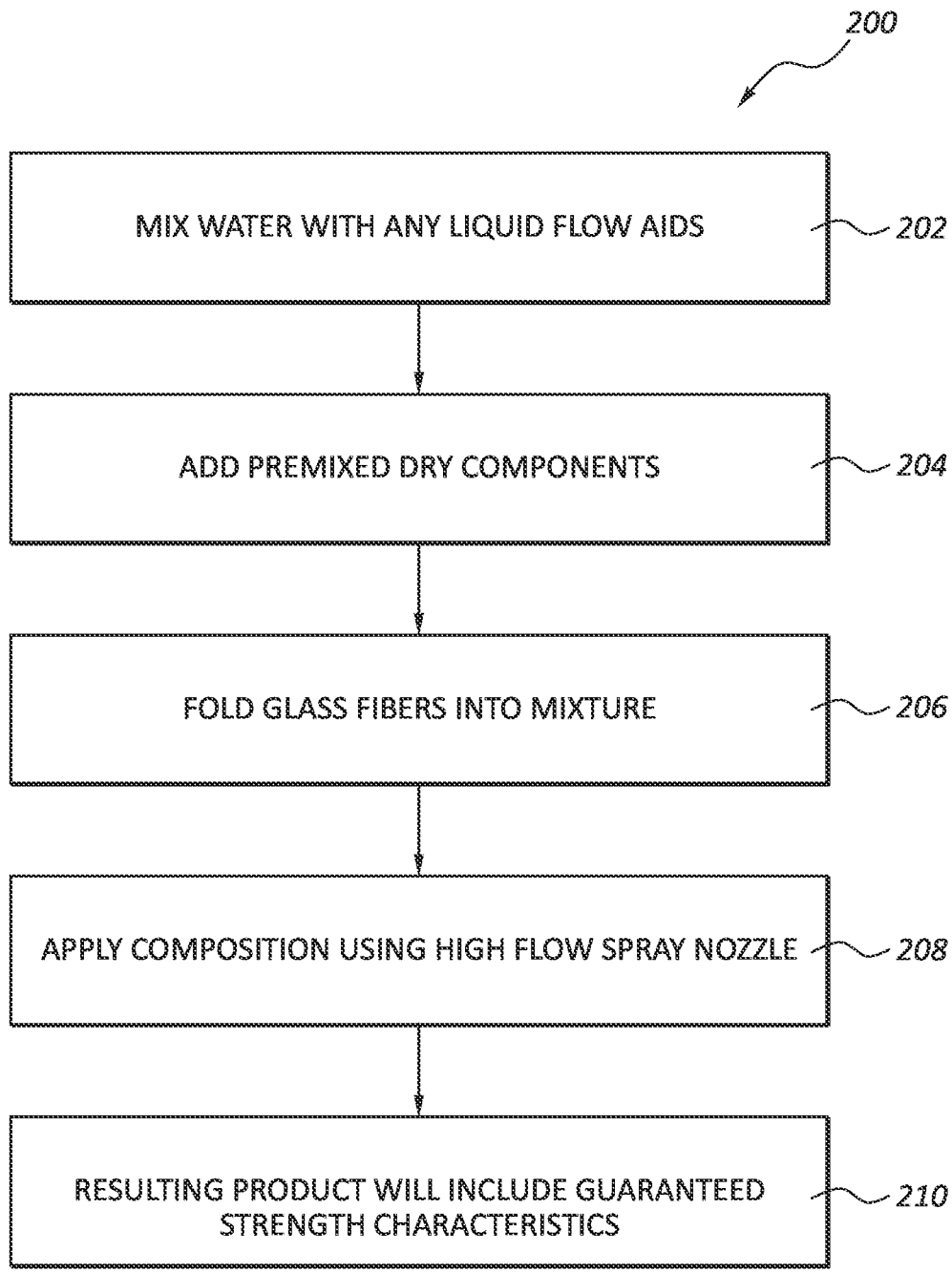
FIG. 2 is a flow chart illustrating an example method of preparing and applying a 3-part glass-fiber-reinforced concrete composition including guaranteed strength characteristics.
Figure 3:
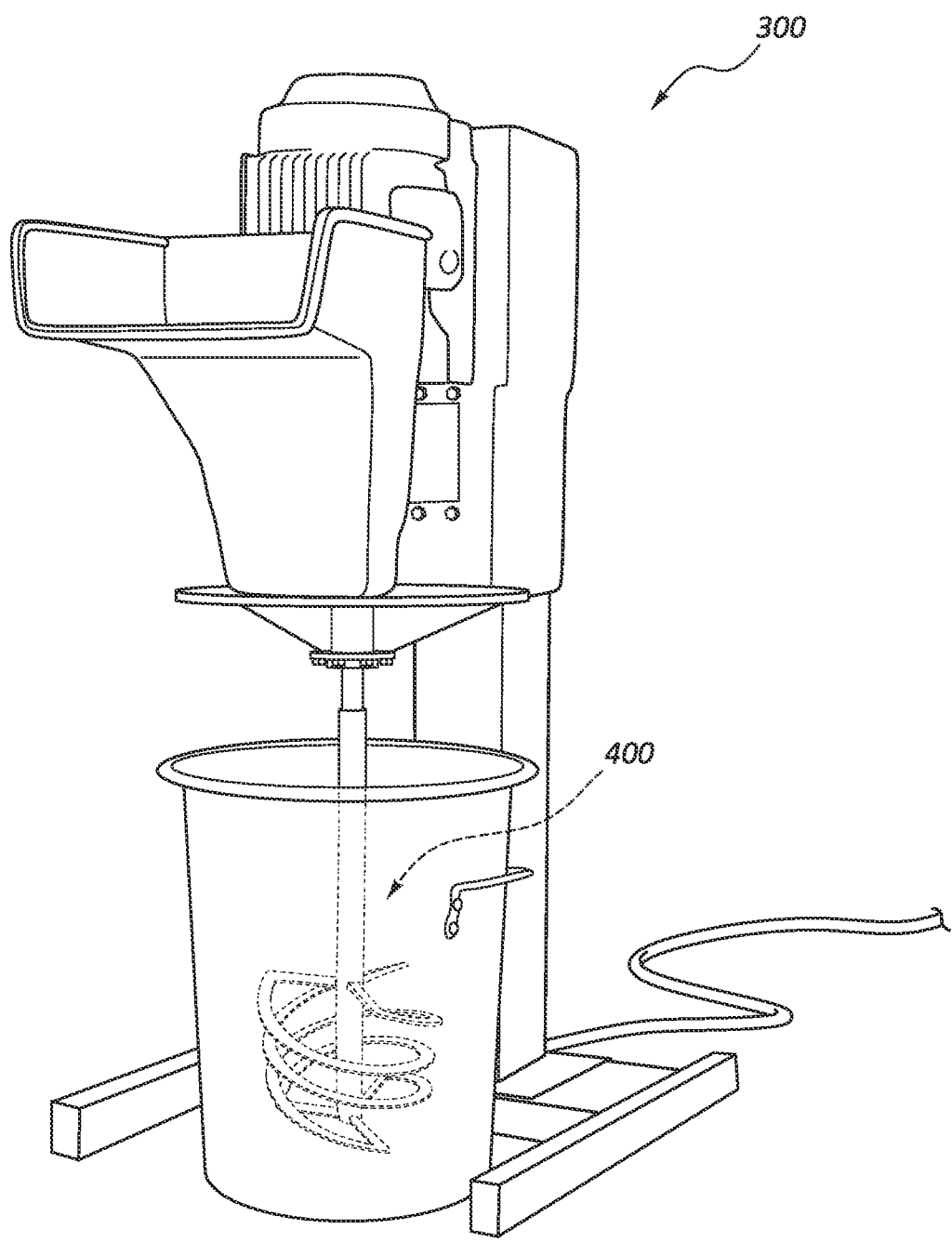
FIG. 3 is a perspective view illustrating an example mixing apparatus that may be used in preparing a 3-part glass-fiber-reinforced concrete composition including guaranteed strength characteristics.

FIG. 2 is a flow chart illustrating such a method 200 in which a flow aids may be mixed with the water at 202, the dry components are mixed with the aqueous liquid component at 204, the glass fibers are folded into the mixture at 206, and the composition is applied using the above described high flow spray nozzle at 208. As shown at 210, the resulting product advantageously includes strength characteristics that are guaranteed. FIG. 3 illustrates an exemplary mixing apparatus 300 that has been found to be suitable for preparing the concrete composition, which may then be pumped through a spray nozzle for spray application.

Once prepared as described, the fresh concrete composition can be delivered through a spray nozzle as described above onto a desired surface. As described above, the spray nozzle employed may include a nozzle body including a concrete delivery conduit for carrying the fresh concrete composition, which conduit extends between a proximal end and a delivery orifice at a distal delivery end. The spray nozzle further includes an axial air delivery conduit for providing compressed air to the fresh concrete composition within the concrete delivery conduit, which axial air delivery conduit extends between a proximal and distal end terminating within the nozzle body prior to the delivery orifice of the concrete delivery conduit so as to delivery compressed air to the fresh concrete composition during use.

In addition to the axial air delivery conduit, the spray nozzle further includes a plurality of radial air delivery conduits for providing compressed air to the fresh concrete composition within the concrete delivery conduit. The radial air delivery conduits are disposed radially about the concrete delivery conduit, at a location that is distal to the axial air delivery conduit. As such, the radial air delivery conduits are able to deliver compressed air to the fresh concrete composition just before it exits the nozzle body through the delivery orifice for application to a desired surface.

Providing compressed air at two different, spaced apart locations (the axial conduit being more proximal within the nozzle and the radial conduits being distal, near the delivery orifice) advantageously and surprisingly allows delivery of a fresh concrete composition including glass-fibers already dispersed within the composition, without any substantial plugging or clogging as previously experienced with spray nozzle equipment. This is so even though the applied air pressure of the compressed air is substantially the same as used in state of the art systems found to clog and plug. Surprisingly, by dividing the compressed air stream, and delivering a first portion of the compressed air at a first location, and delivering another portion of the compressed air at a downstream location, a fresh concrete composition including reinforcing glass fibers dispersed therein is able to flow through the concrete delivery conduit without any substantial clogging or plugging. The inclusion of a flow aid within the concrete composition further aids in delivery without substantial clogging or plugging.

Because the fresh concrete composition can readily be applied without clogging or plugging, there is no need for the technician to attempt to improve flow characteristics by on-the-fly addition of water or otherwise altering the compositional characteristics. As such, the concrete composition can be precision tailored to provide predetermined, guaranteed, high strength characteristics. For example, upon curing, the glass-fiber-reinforced concrete composition can provide a predetermined, guaranteed modulus of rupture (MOR) value of at least 16 MPa and a limit of proportionality (LOP) value of at least 7 MPa with a glass-fiber content of only 4% (i.e., no more than 4%) by weight of the uncured composition.

LOP designates the amount of stress up to which stress is proportional to strain), so that the stress-strain graph is a substantially straight line. The gradient or slope of that line will be equal to the elastic modulus of the material. MOR describes a material's ability to resist deformation under load. For example, in determining MOR, a specimen (e.g., rectangular cross-sectioned coupon) may be bent until fracture (e.g., a transverse bending test). MOR represents the highest stress experienced within the material at its moment of rupture.

Even higher guaranteed strength values can be achieved, such as at least 18 MPa MOR, at least 19 MPa MOR, at least 8 MPa LOP, or at least 9 MPa LOP. Such values can be achieved with glass-fiber loads of no more than 4% by weight. Relatively higher loads of glass-fibers within the uncured concrete composition affect strength characteristics. Thus, where lower guaranteed strength characteristics are required, the glass-fiber loading may be less than 4% (e.g., less than 3%, 2%, or 1%, etc.). Because of the excellent control provided over the concrete's compositional characteristics (at least partially as a result of the ability to prevent clogging and/or plugging), randomization of glass-fiber orientation, and resulting very high guaranteed strength values, as a practical matter there is no need to go beyond about 4% fiber loading. That said, higher fiber loaded compositions may also be delivered without any substantial clogging or plugging of the spray nozzle, if such were desired.

While other glass-fiber reinforced concrete compositions may possibly attain such high strength levels, the strength is rarely if ever guaranteed because of a tendency by the operator to on-the-fly adjust the compositional characteristics of the composition during spray application. Furthermore, where such high strength levels may be achieved, it may be through the use of higher fiber loads (e.g., 6-7% fiber loading). In addition, the achievance of such high strength is also associated with high rates of waste, as the application conditions are not readily reproducible. As such, the achievance of such high strength with prior art compositions and methods is something of an anomaly.

In addition, such systems and methods are not able to deliver the reinforcing glass fibers through the concrete delivery conduit, with the uncured concrete, but are forced to deliver the glass-fiber along a parallel delivery path, where it is cut adjacent the nozzle delivery orifice and only introduced into the composition at that point. As a result, such methods and systems exhibit increased complexity, may exhibit reduced randomness of orientation of the glass fibers, and resulting decreased strength compared to the present inventive systems and methods.

According to one embodiment, a small fraction of a flow aid, such as a cellulosic ether, and a plasticizer, such as an acrylic plasticizer, may be mixed with the liquid part and/or the dry part prior to mixing the liquid and dry parts together. In one embodiment, a flow aid and plasticizer can be mixed with or form part of a liquid part prior to or while mixing the liquid part with a dry part. Inclusion of even a small amount of such a flow aid, in combination with a plasticizer, further enhances the flow characteristics (e.g., tendency to avoid clogging or plugging) of the resulting concrete composition.

Figure 4:
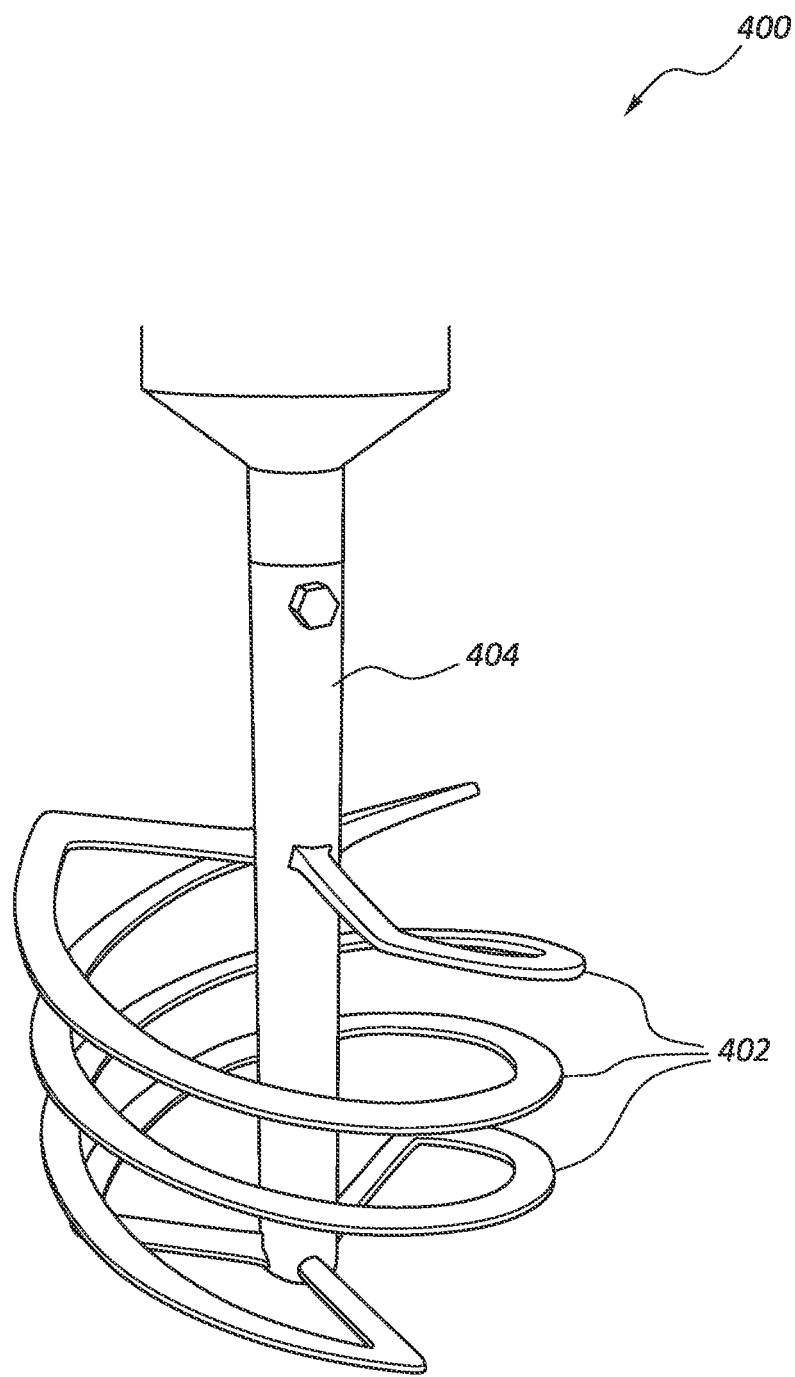
FIG. 4 is a close up view of the mixing blade configuration of the example mixing apparatus shown in FIG. 3, which is particularly configured to disperse glass fibers into the composition without causing damage to the glass fibers.

In one embodiment, it may be important to ensure that the mixing blade employed in mixing the glass fibers into the uncured concrete composition achieves substantially homogenous distribution of fibers while randomizing fiber orientation to provide substantially equal strength in all directions of the cured concrete product. It is also beneficial that the mixing blade not cut the glass fibers while dispersing them into the composition, as this may decrease the resulting strength of the cured concrete product. One such mixing blade configuration 400 that has been found to be suitable includes a plurality of substantially helical blades 402 that extend helically about a length of a central shaft 404, as shown in FIG. 4.

IV. Exemplary Glass-Fiber-Reinforced Concrete Compositions With Predetermined Strength Characteristics Another aspect of the present invention is directed to the fresh (e.g., 3-part) glass-fiber reinforced concrete composition itself, which composition provides predetermined or guaranteed strength characteristics. The terms predetermined and guaranteed are used interchangeably herein. As alluded to above, the glass-reinforced concrete composition includes a liquid part that may include water and a cellulosic ether flow aid; a dry part, and a reinforcing part including glass-fibers. The dry part includes cement, and a particle packing aggregate. An acrylic plasticizer may be included in the liquid part or the dry part. At least a portion of the particle packing aggregate is rounded (i.e., smoothed) rather than crushed. In addition, the aggregate is present in two distinct sizes so as to include a first aggregate portion having a first particle size and a second aggregate portion having a second particle size smaller than the first particle size so that the aggregate is capable of particle packing. For example, at least one of the aggregate size materials is rounded. The other(s) may be rounded or jagged/crushed. A ratio of the water provided by the liquid part to the cement provided by the dry part may be from about 0.25:1 and about 0.4:1 (about 0.35:1). The glass fibers of the reinforcing part may comprise no more than about 4% of the glass-fiber-reinforced concrete composition.

For example, according to one example, the dry portion may include 3 sizes of aggregate (e.g., two rounded silica aggregates of different sizes such as Wedron silica 530 and Wedron silica 710, in addition to a crushed/jagged carbonate aggregate such as MarbleWhite 80). The silica aggregates may be present within a combined range of about 50% to 100%, from about 70% to about 95%, or from about 80% to about 90% of the total aggregate. Where two silica aggregates are present, the smaller aggregate may be present in a range from about 20% to about 50%, from about 25% to about 45%, or from about 30% to about 40% (e.g., about 35%) by weight of the aggregate portion of the dry portion of the cement composition. The larger of the silica aggregates may be present in a range from about 30% to about 70%, from about 35% to about 65%, or from about 40% to about 60% (e.g., about 50%). The carbonate aggregate may be present within a range of about 5% to about 30%, from about 10% to about 25%, or from about 10% to about 20% (e.g., about 15%) of the total aggregate.

As described above, in one embodiment, the glass-fiber-reinforced concrete composition provides a predetermined, guaranteed MOR value of at least 16 MPa, preferably at least 18 MPa, and more preferably at least 19 MPa (e.g., MOR may be from about 18 MPa to about 24 MPa). In one embodiment, the LOP values provided by the glass-fiber-reinforced concrete composition are predetermined and guaranteed to be at least 7 MPa, preferably at least 8 MPa, or more preferably at least 9 MPa (e.g., LOP may be from about 8 MPa to about 10 MPa).

As described above, a cellulosic ether may be included within the composition as a flow aid to further aid in preventing clogging and/or plugging of the spray nozzle as the composition including reinforcing glass-fibers is sprayed. Examples of cellulosic ethers that may be suitable for use include, but are not limited to, methylhydroxyethylcellulose, hydroxymethylethylcellulose, carboxymethylcellulose, methylcellulose, ethylcellulose, hydroxyethylcellulose, hydroxyethylpropylcellulose, hydroxymethylcellulose, and combinations thereof.

The cellulosic ether flow aid included within the liquid part of the cement composition may be included in any suitable amount. In one embodiment, the cellulosic ether flow aid comprises about 0.001% to about 0.1% of the glass-reinforced-concrete composition by weight. In another embodiment, the cellulosic ether flow aid is included from about 0.005% to about 0.05%, or more preferably from about 0.01% to about 0.03% (e.g., about 0.02%) by weight of the composition.

An acrylic plasticizer may be included with the concrete composition. Examples of suitable acrylic materials include, but are not limited to polyacrylic acids, polyacrylic acid salts, polyvinylacrylic acids, polyvinylacrylic acid salts, polyacrylimides, and combinations thereof. For example, the acrylic component may be a copolymer of vinyl acetate and an alkene such as ethylene. The acrylic component included within the glass-fiber-reinforced concrete composition may be included in any suitable amount. In one embodiment, the acrylic component comprises about 0.01% to about 10% of the glass-reinforced-concrete composition by weight. In another embodiment, the acrylic component is included from about 0.1% to about 5%, or more preferably from about 0.5% to about 2% (e.g., about 1%) by weight of the composition.

The ratio of the acrylic plasticizer to cellulosic ether flow aid may advantageously be selected to minimize any tendency of the fresh fiber filled concrete composition to plug or clog when extruded or sprayed under pressure. According to some embodiments, the acrylic plasticizer and cellulosic flow aid may be included in a ratio of about 2.5:1 to about 25:1 by weight of acrylic plasticizer to cellulosic flow aid, or in a ratio of about 5:1 to about 15:1 by weight of acrylic plasticizer to cellulosic flow aid, or in a ratio of about 6:1 to about 12:1 by weight of acrylic plasticizer to cellulosic flow aid. It has been found that including the acrylic plasticizer and cellulosic ether flow aid in the foregoing ratios minimizes the tendency of water to be squeezed out of the fibers and/or aggregates when the fresh concrete composition is sprayed or extruded under pressure. The acrylic plasticizer reduces the overall amount of water that would otherwise be required to achieve a desired flow, and the cellulosic ether flow aid further acts to eliminate bleeding or segregation, which might otherwise cause or allow the fibers to become compacted within a spray nozzle or extruder conduit under pressure, which can cause plugging or clogging of the delivery apparatus.

The reinforcing glass-fibers included within the glass-fiber-reinforced concrete composition may be included in any suitable amount. In one embodiment, the glass fibers comprise about 0.5% to about 4% of the glass-reinforced-concrete composition by weight. In another embodiment, the glass fibers are included from about 1% to about 4%, or more preferably from about 2% to about 4% by weight of the composition. The above weight fractions of glass fibers may apply to both the uncured concrete composition and the cured concrete composition, as any water loss (not consumed in hydration) may be relatively small.

The glass fibers may have length, diameter, and aspect ratio characteristics as desired. By way of example, in one embodiment, the glass-fiber length may be from about 0.25 inch to about 3 inches, from about 0.5 inch to about 2 inches, or from about 0.75 inch to about 1.5 inches. The diameter of the glass fiber may be between about 1 and 100 µm, between about 10 and about 50 µm, or between about 15 and about 20 µm. The aspect ratio (length to diameter) may range from about 10 to about 50,000, from about 100 to about 10,000, from about 1000 to about 3000, or from about 1000 to about 2000. The glass may be alkali resistant, and have a moisture content of less than about 0.5%.

Examples of glass-fiber-reinforced concrete compositions are provided below.

Example 1

| Component | Weight Percent |
| --- | --- |
| Cement | 41% |
| Aggregate (3 sizes) | 40% |
| Acrylic | 1% |
| Glass-fibers (1 inch length, 18 µm dia.) | 4% |
| Water | 14% |
| Cellulosic Ether | 0.02% |

The glass-fiber-reinforced concrete composition of Example 1 was prepared using a PowerSprays GRC 125 Combination Mixer (similar to that shown in FIG. 3). The mixer dial of the GRC 125 mixer was set to "5". The water was added to the mixing container. The water temperature was no more than 48° F. (e.g., between about 32° F. and about 50° F.). The cellulosic ether flow aid was added to the water. An optional tinting color pigment was added to the liquid part, and the components were mixed for 15 seconds at mixer setting "5". A premixture of the dry components, including the cement, the aggregate, and the acrylic were then slowly added to the mixing container. With the mixer setting still at "5", the dry part was mixed with the liquid part for 1 minute. After 1 minute of mixing, the mixer was stopped and the sides of the mixing container and the mixing blade were scraped. Following scraping, the dry and liquid parts were again mixed for an additional minute at a mixer speed setting of "3".

A slump test kit (e.g., Power Sprays Slump Test Kit) was used to assess the flow of the mixture. Where flow measures less than a value of "2", the mixture may be mixed in additional 15 second intervals with slump testing after each 15 second mixing interval until the flow measures between "2" and "3". Once the flow of the mixture was as desired, the glass-fibers were folded into the concrete mixture at a mixer setting of "1". Once the glass-fibers were folded in, the mixer was stopped and the sides of the mixing container and the mixing blade were again scraped. At this point, the mixed concrete composition was checked to ensure that the glass-fibers were homogenously dispersed, rather than present as clumps or plates of glass fiber within the composition. Following scraping and inspection, the glass-fiber-reinforced concrete composition was again mixed for an additional 15 seconds at a mixer speed setting of "1".

The prepared glass-fiber-reinforced concrete composition was sprayed using a Power Sprays PS38A GRC Combination Spray Station using the spray nozzle as shown in FIGS. 1A-1B. Strength characteristics of coupons of the resulting cured glass-fiber-reinforced concrete composition were tested. In summary, the results showed LOP ratings of 10-12 MPa and MOR ratings between 17-24 MPa for a thickness of about 9 mm.

An example with substantially identical strength and application characteristics to that of Example 1 was prepared using 12.5% water (i.e., add 12.5 lbs water per 40 lb bag). It included a water to cement ratio of 0.3125:1.

V. Exemplary Composite Structural Insulated Panel Building Systems

Figure 5:
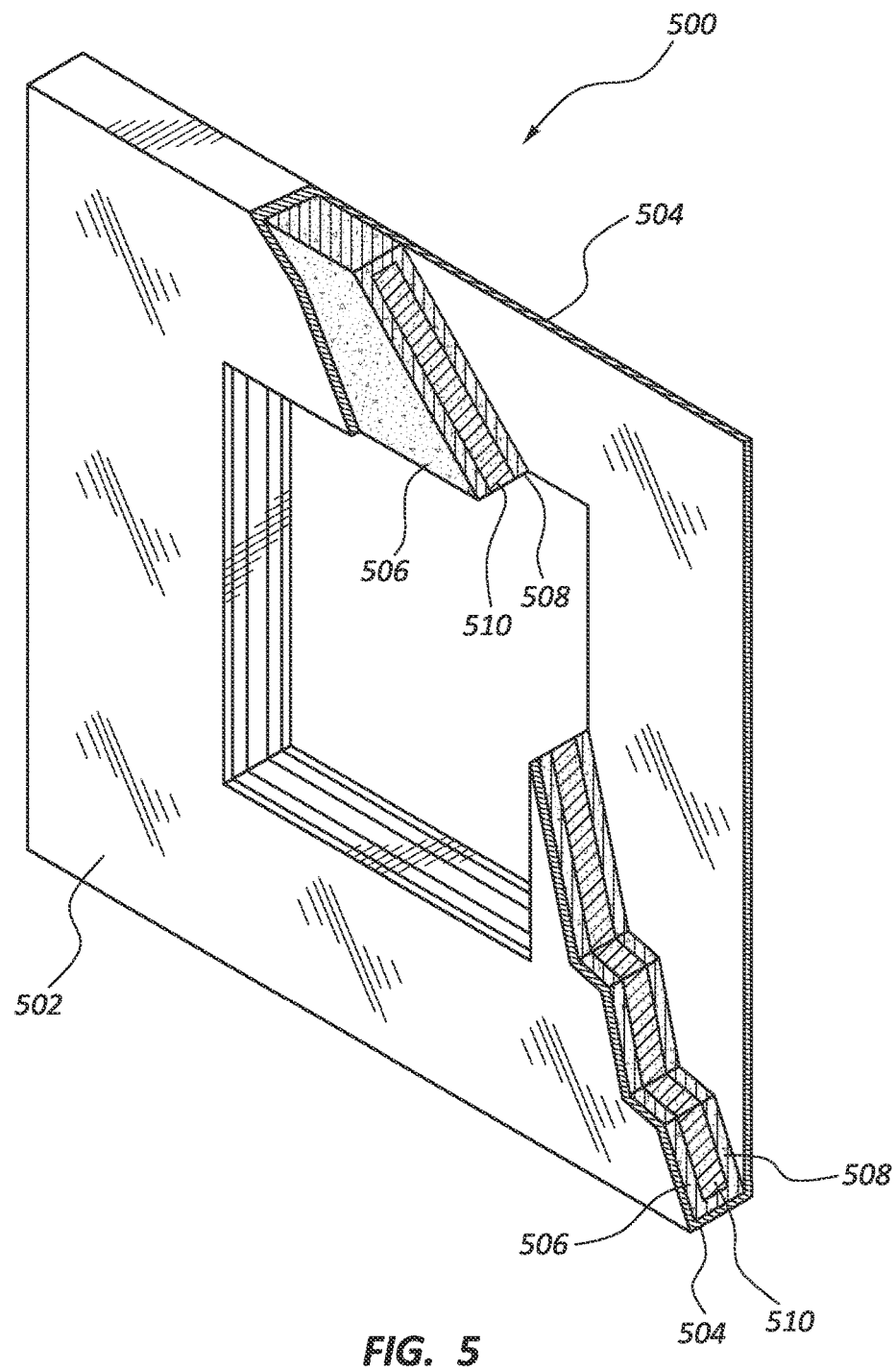
FIG. 5 is a cut away view of an exemplary composite structural insulated panel according to another aspect of the present invention that can be formed with the glass-fiber-reinforced concrete composition including guaranteed strength characteristics.
Figure 6:
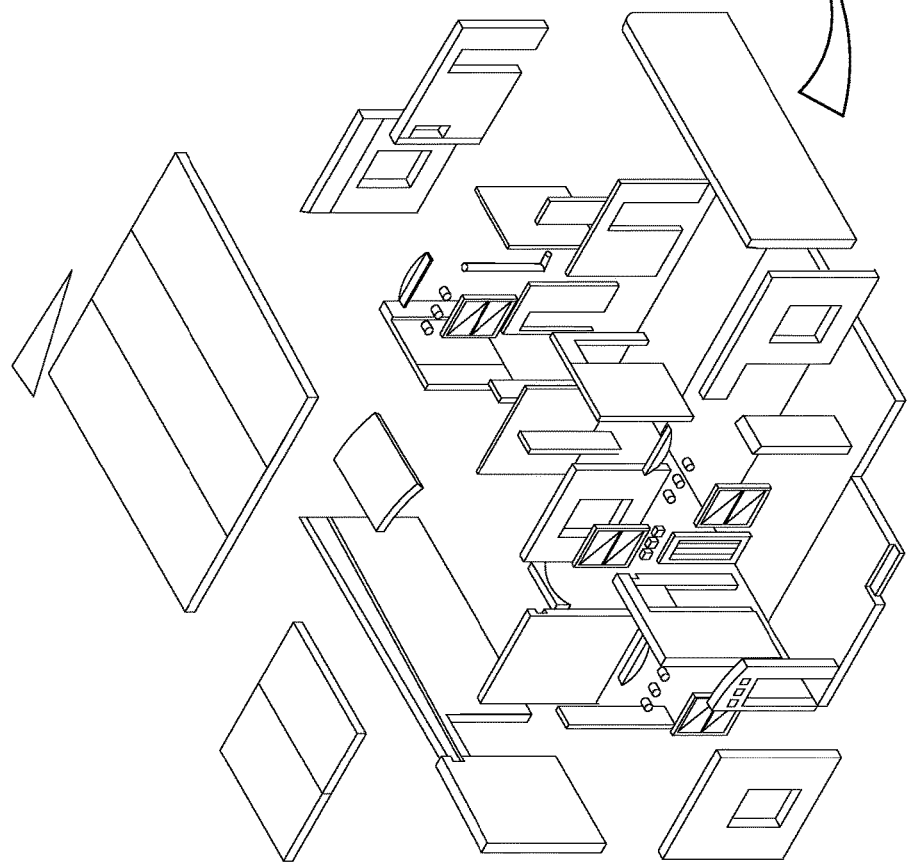
FIG. 6 shows a panelized building system.
Figure 7:
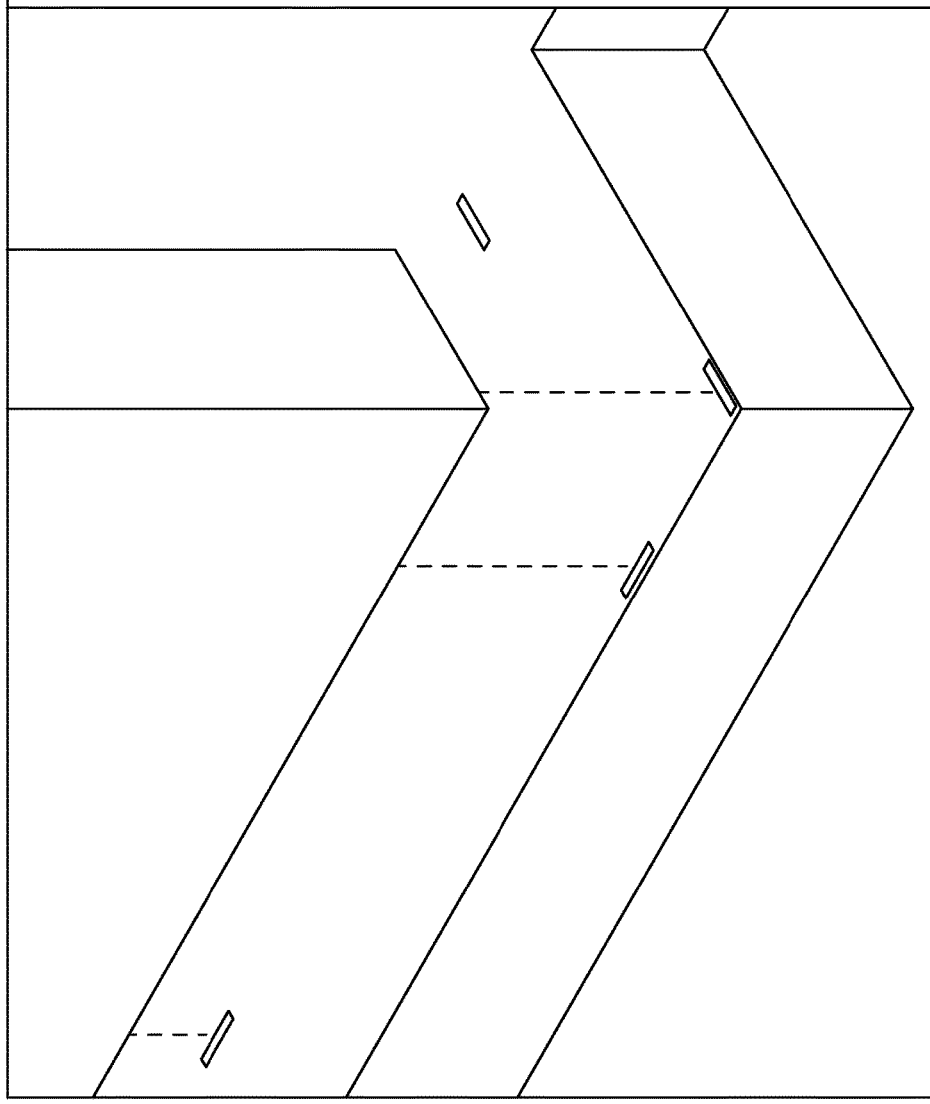
FIG. 7 shows on-site assembly with embedded cam-locks.
Figure 7:
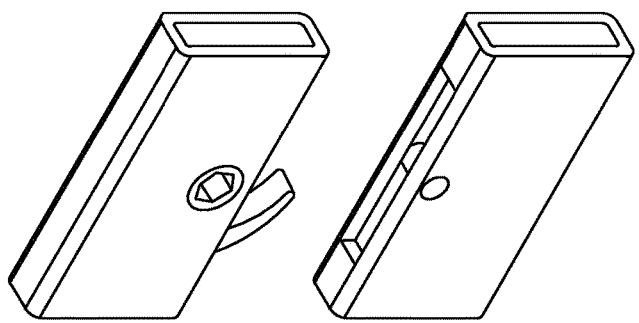
Figure 8:
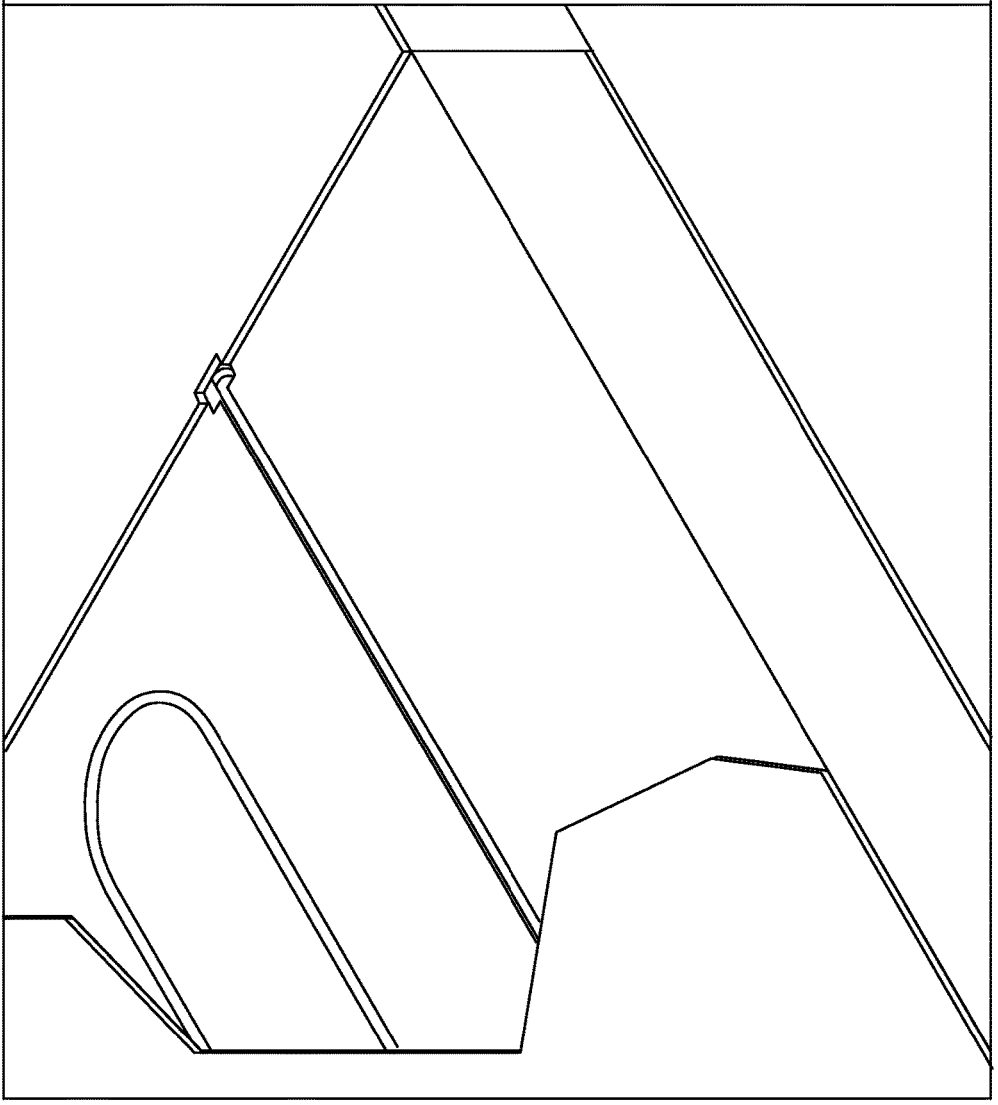
FIG. 8 shows hydronic PEX tubing embedded within floor panels.

Another aspect of the present invention is directed to composite structural insulated panels and associated panel systems including a plurality of such panels. At least a portion of such panels may be formed from or to include the above described glass-fiber reinforced concrete compositions. Such a composite panel may include an exterior veneer, and an interior veneer. The composite panel further includes a first glass-fiber-reinforced concrete shell layer disposed adjacent to the exterior veneer and between the exterior veneer and an insulating foam core. A second glass-fiber-reinforced concrete shell layer is disposed adjacent the interior veneer, between the insulating foam core and the interior veneer. The insulating foam core is thus sandwiched between the first and second glass-fiber-reinforced concrete shell layers. The insulating foam core may be partially, substantially, or completely encapsulated by the glass-fiber-reinforced concrete shell layers. For example, the ends of each panel (e.g., top, bottom, left, right) may optionally include the glass-fiber-reinforced concrete shell layers, and optionally the veneer layer. Thus, in some cases, the foam core may not be exposed at all. In another embodiment, at least the outside peripheral edges of the insulating foam core may be encapsulated by the glass-fiber reinforced concrete shell layers, as seen in FIG. 5, where the foam core 510 may be exposed at the illustrated window cut out. Similar exposure may occur at a door cut out, etc.

The exterior and interior veneers may provide a desired finished texture or aesthetic appearance. For example, they may provide a desired color (e.g., white, off-white, red, brown, green, granite, etc. other than natural concrete gray), similar to what might be provided by a stucco coat. Any color, texture, or faux pattern or finish may be provided. The veneer is intended to provide very fine control over the finished surface. In other words, the veneers are suitable and intended to be used as finished surfaces, and require no additional finishing, texturing, painting, etc. As such, they may provide a finished interior or exterior surface within a residential or commercial building space, so that there is no need for taping, mudding, painting, or even drywalling. As such, the veneer surfaces may truly provide a finished surface with the full aesthetic characteristics provided by any other finished surface that may require drywalling, taping, mudding, painting, texturing, faux finishes, patterns, etc. One advantage of the present composite panels that no such finish work is required.

Of course, in some embodiments there may be no need for an exterior veneer, an interior veneer, or both (e.g., where a rough, concrete gray surface is acceptable). Of course, it is also possible to add a color tinting pigment to the concrete composition itself so that the concrete shell layers may have a desired color other than the typical concrete gray. For some such applications, the interior veneer, exterior veneer, or both may be omitted.

FIG. 5 illustrates such an exemplary composite panel 500 including an interior veneer 502, an exterior veneer 504, a first glass-fiber-reinforced concrete shell layer 506, a second glass-fiber-reinforced concrete shell 508, and an insulating foam core 510 sandwiched between the concrete shell layers 506 and 508. The illustrated embodiment includes encapsulation of at least the outside peripheral edges of foam core 510 by concrete shell layers 506 and 508, including around the top, bottom, and left and right ends. Furthermore, the veneers 502 and 504 may encapsulate the outside peripheral edges of concrete shell layers 506 and 508. Where a window or other cut out is present, these internal layers may include an exposed surface, as seen in FIG. 5. Advantageously, no transverse ties or other structures are required to run through the thickness of panel 500, so that thermal bridging, puncture, and compromise of insulating foam core 510 is minimized or prevented.

The insulating foam core may comprise any suitable foam material providing sufficient insulative ability. Expanded polystyrene is an example of one such suitable material. Examples of other suitable foam materials include foamed polyurethanes or other foamed polystyrenes (e.g., extruded polystyrene). Various other suitable insulating foam materials may be apparent to one of skill in the art in light of the present disclosure.

The composite panel systems can be manufactured by sequentially forming or placing each of the required layers in a wet-on-wet fabrication technique, resulting in maximal molecular adhesion between the component materials. For example, veneers and concrete layers 506 and 508 may be applied by spraying. Where a wet-on-wet technique is employed, the component materials of the layers may be sprayed sequentially (e.g., into a mold). For example, a veneer layer may be sprayed into such a mold, and while wet, the adjacent glass-reinforced concrete shell layer may be sprayed thereover. The foam core 510 (e.g., a pre-expanded polystyrene foam) may be placed adjacent the applied concrete shell layer (e.g., shell layer 508), and the next shell layer 506 and adjacent veneer (e.g., 502) may be sprayed thereover. Because of this wet-on-wet fabrication technique, excellent adhesion is provided between the layers as they cure simultaneously. In an embodiment, if desired, one or both veneer layers 502 or 504 may be omitted (e.g., where a fiber reinforced concrete layer provides a suitable interior or exterior surface finish). Of course, if desired, a traditional veneer (e.g., stucco or other surface finish) could be applied thereover (e.g., after layer 506 or 508 has cured).

In one embodiment, plumbing and/or electrical components may be embedded within the composite panel (e.g., within foam core 510). For example, plumbing pipes and hook ups for plumbing fixtures may be embedded within the composite panel. Similarly wiring, as well as electrical boxes for switches, outlets, lighting fixtures, and other electrical components may be embedded within the panel. Such plumbing and/or electrical components can be placed so as to provide access to the given component at an exterior surface of the panel. This allows embedded plumbing and/or electrical components of one panel to be connected to corresponding components of another panel when joining panels together. For example, plumbing pipes may be coupled together from one panel to another, and electrical wiring may be electrically coupled together so as to provide the desired connection from one panel to the next for a given plumbing or electrical line or system.

The panels of the building system may include structure for joining one panel to another into a desired building configuration (e.g., connecting a wall panel to a wall panel, a wall panel to a roof panel, a roof panel to a roof panel, a wall panel to a floor panel, etc.). In one embodiment, a system of brackets may be provided for joining adjacent panels to one another. Such a bracket may also be embedded within the panel, or fastened to the panel. Bolts or other fasteners may be employed to secure brackets of two panels together, effectively joining the two panels to one another. Such joining structures are examples of means for joining adjacent panels to one another. Once the panels have been joined, any cracks or space (if any) at the interface between adjacent panels may be filled by a sealant.

The slides attached to the provisional application herein incorporated by reference show an exemplary residential or commercial building mock up where the building frame (e.g., walls, floor, and roof) may be constructed of such a plurality of panels. The slides further show an exemplary embedded bracket system including cam-locks that may be used to join adjacent panels together, without the need for bolts. The slides also illustrate how PEX tubing or other plumbing lines, fixtures, or other plumbing components may be embedded within the interior of the panel, with an end of the PEX tubing or other plumbing or electrical fixture accessible at an exterior surface of the panel so as to allow connection of the embedded components from one panel to another panel.

Also attached to the provisional application herein incorporated by reference is a transverse load span analysis of exemplary composite panels made from the glass-reinforced concrete composition, a foam core, and that may include interior and exterior finish veneers. The analysis and the test results that the analysis is based on show that panels, and structures formed therefrom can provide excellent strength characteristics, which strength characteristics can be predetermined and guaranteed. The strength achieved is far superior to traditional structural insulated panels (SIPs) formed from oriented strand board (OSB) or plywood structural members that sandwich a foam core therebetween.

As used in this specification and the appended claims, the singular forms "a," "an" and "the" include plural referents unless the context clearly dictates otherwise.

The present invention can be embodied in other specific forms without departing from its spirit or essential characteristics. Thus, the described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A spray nozzle, comprising:
 a nozzle body having a proximal end and a distal delivery end;
 a delivery orifice at the distal delivery end of the nozzle body;
 a concrete delivery conduit extending through between the proximal end and the delivery orifice;
 an axial air delivery conduit having a proximal end and a distal end, the distal end of the axial air delivery conduit terminating within the nozzle body at a location between the proximal end of the nozzle body and the delivery orifice; and
 a plurality of radial air delivery conduits disposed radially about the distal delivery end of the nozzle body, the plurality of radial air delivery conduits being disposed distally relative to the distal end of the axial air delivery conduit,
 wherein the spray nozzle is configured to spray an uncured glass-fiber-reinforced concrete composition out the delivery orifice in a manner that prevents clogging,
 wherein the plurality of radial air delivery conduits are configured to deliver compressed air to the uncured glass-fiber-reinforced concrete composition as it exits the delivery orifice.

2. The spray nozzle as in claim 1, wherein the axial air delivery conduit is configured to provide compressed air to the uncured glass-fiber-reinforced concrete composition within the concrete delivery conduit during use.

3. The spray nozzle as in claim 1, wherein the distal end of the axial air delivery conduit is concentric with the concrete delivery conduit.

4. The spray nozzle as in claim 1, wherein the spray nozzle includes from about 5 to about 20 of the radial air delivery conduits.

5. The spray nozzle as in claim 1, wherein the radial air delivery conduits each include proximal ends coupled to a single air delivery conduit which supplies compressed air to each of the radial air delivery conduits simultaneously.

6. The spray nozzle as in claim 5, wherein the axial air delivery conduit is configured to be coupled to a same source of compressed air as the air delivery conduit that feeds the radial air delivery conduits.

7. The spray nozzle as in claim 6, wherein the axial air delivery conduit and the radial air delivery conduits are configured to deliver air at substantially the same pressure.

8. The spray nozzle as in claim 1, wherein the axial air delivery conduit terminates within the concrete delivery conduit at a location that is from about 2 inches to about 6 inches proximal to a location where the plurality of radial air delivery conduits terminate into the concrete delivery conduit.

9. The spray nozzle as in claim 8, wherein the plurality of radial air delivery conduits terminate within the concrete delivery conduit at a location that is from about 0.5 inch to about 0.125 inch proximal to the delivery orifice.

10. The spray nozzle as in claim 1, wherein the axial air delivery conduit is configured to deliver compressed air in a trajectory that is substantially parallel with a longitudinal axis of the concrete delivery conduit.

11. The spray nozzle as in claim 1, wherein each of the radial air delivery conduits is configured to deliver compressed air in a trajectory that is non-parallel relative to the longitudinal axis of the concrete delivery conduit so as to cause compressed air flow from the radial air delivery conduits to turbulently impinge upon an uncured glass-fiber-reinforced concrete composition flowing through the concrete delivery conduit during use.

12. A method for preparing and applying a glass-fiber-reinforced concrete composition to a surface using the spray nozzle of claim 1, the method comprising:
mixing a dry part including cement and an aggregate with a liquid part including water to form an uncured concrete pre-mix;
thereafter mixing glass fibers into the uncured concrete pre-mix to form a glass-fiber reinforced concrete composition;
delivering the glass-fiber-reinforced concrete composition to the spray nozzle for application of the glass-fiber-reinforced concrete composition to a surface; and
spraying the glass-fiber-reinforced concrete composition from the spray nozzle to a surface.

13. A method as in claim 12, further comprising including a flow aid within the liquid part prior to mixing with the dry part.

14. A method as in claim 12, wherein mixing the dry part with the liquid part to form the uncured concrete pre-mix is performed using a mixing apparatus operating at a first speed, and wherein mixing the glass fibers into the uncured concrete pre-mix to form the glass-fiber reinforced concrete composition is performed using a mixing apparatus operating at a second speed that is less than the first speed.

15. A spray nozzle for clog-free delivery of an uncured glass-fiber-reinforced concrete composition, comprising;
a nozzle body having a proximal end and a distal delivery end;
a delivery orifice at the distal delivery end of the nozzle body;
a concrete delivery conduit extending through between the proximal end and the delivery orifice;
an axial air delivery conduit having a proximal end and a distal end, the distal end of the axial air delivery conduit terminating within the nozzle body at a location between the proximal end of the nozzle body and the delivery orifice;
a plurality of radial air delivery conduits disposed radially about the distal delivery end of the nozzle body, the plurality of radial air delivery conduits being disposed distally relative to the distal end of the axial air delivery conduit, wherein the plurality of radial air delivery conduits are configured to deliver compressed air to the uncured glass-fiber-reinforced concrete composition as it exits the delivery orifice; and
a single air delivery conduit which supplies compressed air to each of the radial air delivery conduits simultaneously.

16. The spray nozzle as in claim 15, wherein the spray nozzle includes from about 5 to about 20 of the radial air delivery conduits.

17. The spray nozzle as in claim 15, wherein the axial air delivery conduit terminates within the concrete delivery conduit at a location that is from about 2 inches to about 6 inches proximal to a location where the plurality of radial air delivery conduits terminate into the concrete delivery conduit.

18. The spray nozzle as in claim 15, wherein the plurality of radial air delivery conduits terminate within the concrete delivery conduit at a location that is from about 0.5 inch to about 0.125 inch proximal to the delivery orifice.

19. A spray nozzle, comprising:
a nozzle body having a proximal end and a distal delivery end;
a delivery orifice at the distal delivery end of the nozzle body;
a concrete delivery conduit extending through between the proximal end and the delivery orifice;
an axial air delivery conduit having a proximal end and a distal end, the distal end of the axial air delivery conduit terminating within the nozzle body at a location between the proximal end of the nozzle body and the delivery orifice; and
a plurality of radial air delivery conduits disposed radially about the distal delivery end of the nozzle body, the plurality of radial air delivery conduits being disposed distally relative to the distal end of the axial air delivery conduit,
wherein each of the radial air delivery conduits is configured to deliver compressed air in a trajectory that is non-parallel relative to the longitudinal axis of the concrete delivery conduit so as to cause compressed air flow from the radial air delivery conduits to turbulently impinge upon an uncured glass-fiber-reinforced concrete composition flowing through the concrete delivery conduit during use.

* * * * *

UNITED STATES PATENT AND TRADEMARK OFFICE
CERTIFICATE OF CORRECTION

PATENT NO. : 9,901,888 B2  
APPLICATION NO. : 14/740001  
DATED : February 27, 2018  
INVENTOR(S) : David L. Nicolson Page 1 of 1

It is certified that error appears in the above-identified patent and that said Letters Patent is hereby corrected as shown below:

In the Specification

Column 2
Line 42, change "that less" to –that is less–

Column 3
Line 4, change "then delivered" to –then be delivered–

Column 7
Line 27, change second instance of "delivery" to –deliver–

Column 8
Line 51, change "resulting" to –result in–

Column 12
Line 50, change "panels that" to –panels is that–

Signed and Sealed this  
Tenth Day of July, 2018

Andrei Iancu  
*Director of the United States Patent and Trademark Office*